Jan. 23, 1951     M. O. MILLER     2,538,910
TELEVISION AND PHOTOGRAPHY SYSTEM FOR RACE TRACKS
Filed April 5, 1947     2 Sheets-Sheet 1
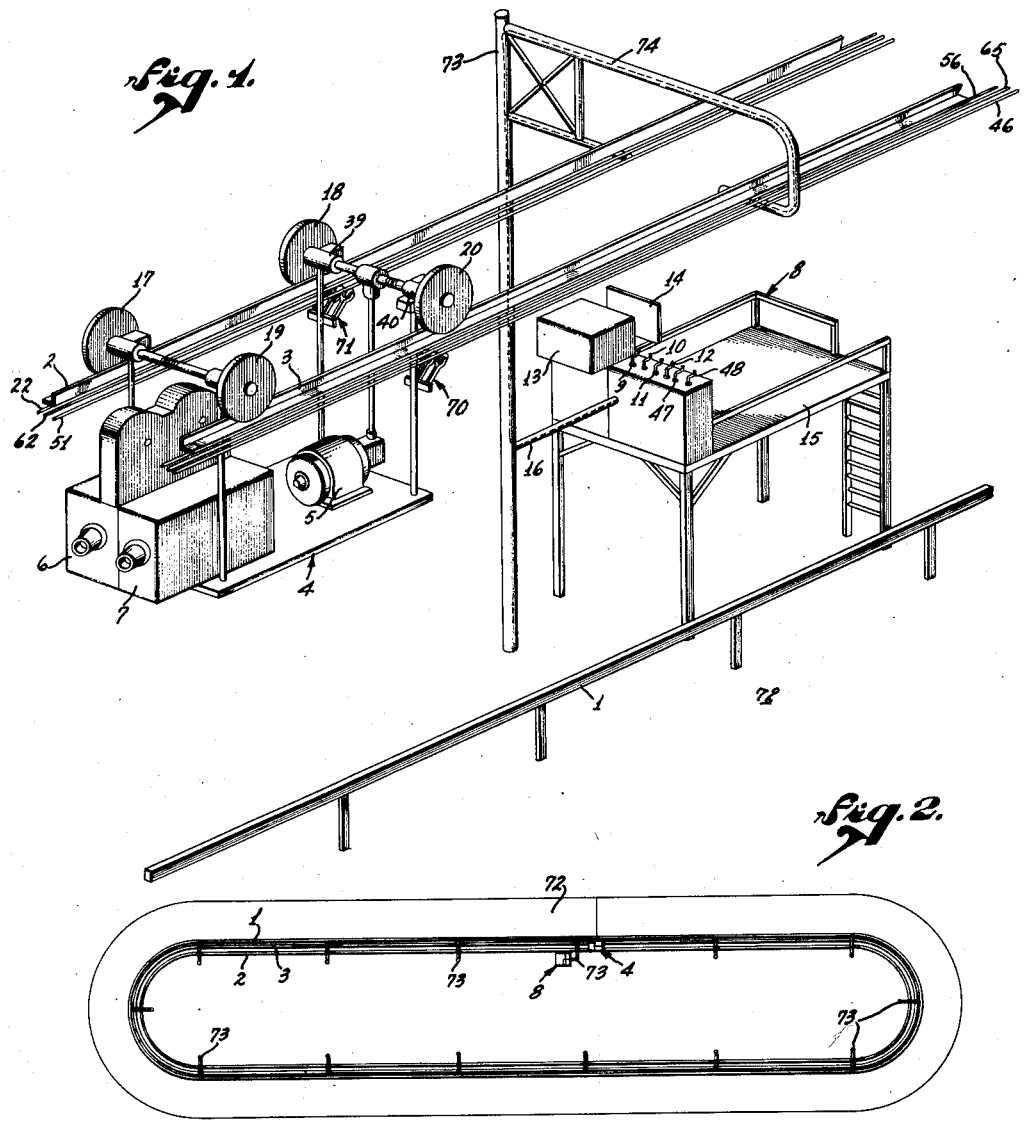
Max O. Miller,
INVENTOR.
BY
ATTORNEY.

Jan. 23, 1951     M. O. MILLER     2,538,910
TELEVISION AND PHOTOGRAPHY SYSTEM FOR RACE TRACKS
Filed April 5, 1947     2 Sheets-Sheet 2
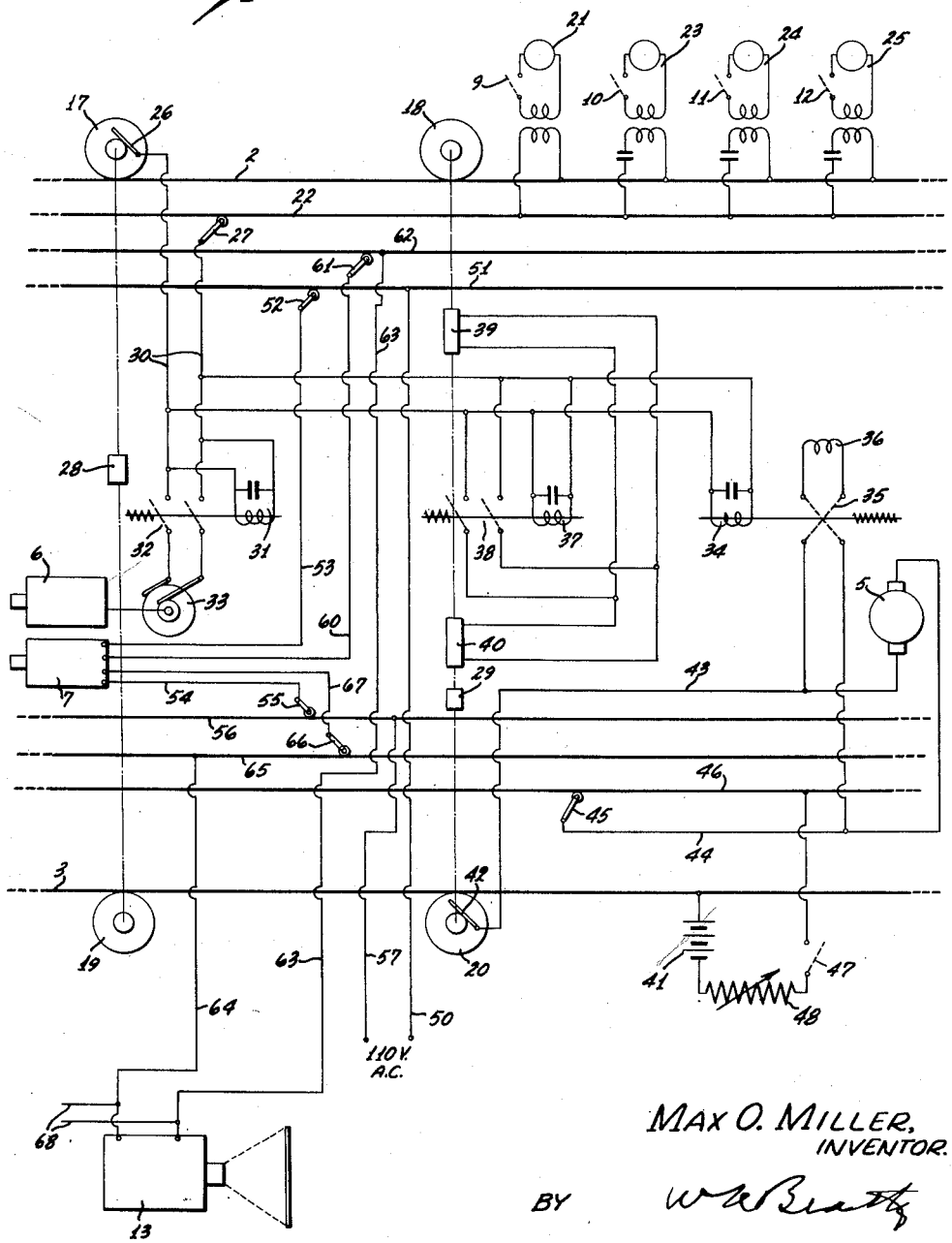
Max O. Miller,
INVENTOR.
BY W. W. Beatty
ATTORNEY.

Patented Jan. 23, 1951

2,538,910

UNITED STATES PATENT OFFICE 2,538,910

TELEVISION AND PHOTOGRAPHY SYSTEM FOR RACE TRACKS

Max O. Miller, Los Angeles, Calif., assignor to Motoview, Inc., Carson City, Nev., a corporation Application April 5, 1947, Serial No. 739,567

5 Claims. (Cl. 178—6)

The invention relates to a television view finder for photographic apparatus.

More particularly, the invention relates to improvements in the photographic apparatus of my co-pending application, S. N. 673,702, filed May 31, 1946, now Patent No. 2,523,662. In that prior application, means are provided for photographing a horse race or the like and for driving the camera along the race course to follow the race, with means whereby an operator can control the speed, direction of movement, and operation of the camera from a remote point. In that case, the operator views the race with binoculars or the like and thereby determines at what speed he should drive the camera along the track for the desired photographic result. The present invention relates to an improvement whereby the operator at the remote point can see substantially the same field of view as that being photographed by the camera. For this purpose the invention provides a television view finder, for improved remote control of the camera.

For further details of the invention, reference may be made to the drawings wherein—

Fig. 1 is a perspective view with parts broken away of a photographic camera and television view finder according to the present invention.

Fig. 2 is a schematic plan view of a race track equipped with the apparatus of Fig. 1.

Fig. 3 is a circuit diagram of the remote control and television view finder for the camera.

Referring in detail to the drawings, the race track 72 in Fig. 1 is on the near side of the usual rail 1 and at the infield is arranged a suitable track having rails 2, 3 for a carriage 4 which runs along the track. The rails 2, 3 extend around the race track 72. The carriage 4 carries a driving motor 5, a photographic camera 6 and a television camera or pickup 7 which views substantially the same scene as that of the camera 6. The carriage 4 is operated from a remote control station 8 having control handles 9, 10, 11, 12, 47, 48 to control the carriage 4 and its apparatus. At the control station 8 is a television receiver 13 having a screen indicated at 14, although this screen may be on the end of the television tube instead of a separate element. The drawing is merely illustrative. The remote control operator by looking at the screen 14 can see the field of view being photographed by the motion picture camera 6 to thereby determine whether the carriage 4 and its camera 6 should be driven faster or slower, or perhaps stopped in case of a spill, and the controls 9 to 12, 47, 48 which are local to the screen 14 can be operated in accordance with the information shown on the screen 14 to obtain the desired motion picture of the complete race.

The control station 8 is here shown as having an elevated platform 15 which is adjacent to the track 2, 3 so that the operator can stand on the platform 15 and service the equipment on the carriage 4. The television receiver 13 and the controls 9 to 12, 47, 48 are not necessarily arranged on the platform 15 and they may, if desired, be arranged elsewhere by extending the circuit connections generally indicated at 16.

In Fig. 3, the four wheels of the carriage 4 are indicated at 17, 18 on rail 2, 19 and 20 on rail 3. Current from a suitable 110-volt line indicated at 21 is fed to rail 2 and to a trolley wire 22 and in parallel thereto are several sources of different multi-plex frequencies indicated at 23, 24, 25. The power line 2 is extended to the carriage through a brush 26 and the other side 22 of that line is extended to the carriage through a trolley 27. Wheels 17 and 19 are insulated from each other by an insulating bushing or sleeve 28 on the axle and wheels 18 and 20 are similarly insulated from each other by a sleeve 29. The switches 9 to 12, 47 in Fig. 3 are at the remote control station 8 as indicated in Fig. 1. When switch 9 is closed, A. C. power is supplied to the line 30 on the carriage 4. When switch 10 is closed, current of a particular frequency is picked up by a circuit 31, tuned to that frequency to operate, directly or through a relay, a switch 32 to connect power line 30 to photographic camera motor 33 to drive the camera 6. This will be done, of course, when the race starts and in the meantime, the carriage 4 may be propelled to a suitable position, while the camera 6 is idle. Also, the switch 9 may be opened to stop the camera 6 when the race is finished, and the finish line may or may not be remote from the control station 8.

When switch 11 is closed, current of another frequency is supplied over an obvious circuit to circuit 34 tuned to the same frequency, to operate directly or through a relay, a reversing switch 35 to reverse the field 36 to reverse the motor 5 and the direction of travel of the carriage 4. Thus, for a short race, the carriage 4 may be propelled in either direction, whichever is shorter, to the start line, and reversed in direction if necessary, to follow the race.

When switch 12 is closed, current of a third frequency is supplied to circuit 37 tuned to that frequency to operate directly or through a relay, a switch 38 to supply power from line 30 to the magnetic brakes 39, 40, to stop the carriage 4.

Current for D. C. motor 5 is taken from a battery 41 having one terminal connected through brush 42 to line 43 connected to one side of switch 35 and one side of the armature of motor 5, the other side of switch 35 and the armature being connected through line 44 and trolley 45 to a trolley wire 46 to which the other side of battery 41 is connected through a switch 47 and speed regulating resistance 48. The controls 47 and 48 are at station 8.

A. C. power is supplied to the television camera or pickup 7, from one side 50 of a power line, through trolley wire 51, trolley 52 and line 53 to pickup 7 and thus through line 54, trolley 55, trolley wire 56 to the other side 57 of the power line.

The electrical current generated by the pickup 7 is transmitted over line 60, trolley 61, trolley wire 62, line 63 to television receiver 13 and over line 64, trolley wire 65 and trolley 66 connected by line 67 to pickup 7. The television current in line 63, 64 may be lead to other television receivers or the like as indicated by the line 68.

The trolleys 55, 66 and 45 may be arranged on a common bracket as indicated at 70 in Fig. 1 and the trolleys 27, 61 and 52 may be arranged on another bracket indicated at 71, although the trolley wires 62 and 65 which carry the television currents to the receiver 13 may be arranged close together on the same side of the track 2, 3 instead of being separated and arranged over different rails 2, 3 as shown in Fig. 1.

The usual coaxial conductor or double conductor as well known may be used for the circuits carrying the television currents.

The photo-camera 6 and television camera 7 view the race from an elevated position above the race track 72 and, for example, as here illustrated, the rails 2 and 3 may be supported by a number of posts like 73, arranged around the race track. The circuit connections from the rails 2, 3 and from the various trolley wires may be led through the crossarm 74 and a particular post 73, and connection 16, to the remote control station 8.

It will be apparent that the photo-camera 6 may be stopped to save film, and started as the race starts and stopped when the race stops, even though the carriage 4 is at a remote position with respect to station 8. Also, by watching the television picture on the screen 14, the operator can see the field of view being photographed and thereby operate the controls to speed up or slow down the carriage, or maintain its speed, or stop it, in order to obtain the desired photographic result.

Various modifications may be made in the invention without departing from the spirit of the following claims. For example, the television apparatus may be operative while the photographic camera is idle, so that the remote control operator can watch the race on the screen while controlling the movement of the carriage, the scene being televised for the benefit or amusement of the remote control operator and for the benefit of others watching the television receivers energized from line 68. The pickup 7 includes a modulator and the receivers like 13 include a detector, details of which are well known. However, the picture current from pickup 7 may be amplified on carriage 4 and transmitted to the receivers like 13 without using a carrier wave.

I claim:

1. The combination of an endless race track for a sporting event, a carriage track around said race track, a carriage movable along said carriage track, a photographic camera and a television camera on said carriage for viewing the same scene of said event, a drive for said carriage, a remote control for said drive for controlling the speed of said carriage, and a television receiver for said television camera, said television receiver being local to said remote control.

2. The combination of an endless race track for a sporting event, a carriage track around said race track, a carriage movable along said carriage track, a television camera on said carriage in position to view said event, a drive for said carriage, a remote control for said drive for controlling movement of said carriage, and a television receiver for said television camera, said television receiver being local to said remote control.

3. The combination of an endless race track for a sporting event, a carriage track around said race track, a carriage movable along said carriage track, an elevated photographic camera and an elevated television camera on said carriage for viewing the same scene of said event, a remote station having an elevated platform adjacent said race track, said camera being accessible to an operator on said platform when said carriage is at said station, a television receiver and screen therefor at said station, sliding contact means for energizing said receiver from said television camera over a wire circuit during movement of said carriage along said carriage track, means at said station for controlling the speed and other means at said station for controlling the direction of movement of said carriage along said carriage track.

4. A television view finder for photographic apparatus comprising an endless track for a sporting event, a carriage track around said race track, said carriage track having a carriage, a photographic camera and a television camera on said carriage for viewing the same scene of said event, means supporting said cameras in elevated position above said race track, a motor for said camera, a switching device on said carriage for said motor, a brake for said carriage, a switching device on said carriage for said brake, a reversible motor for said carriage and a switching device therefor on said carriage, conductors extending along said carriage track, a remote control station and means at said station in circuit with said conductors for selectively operating said switching devices, a television receiver and screen at said station and sliding contact means for energizing said receiver by said television camera over a wire circuit during movement of said carriage along said carriage track.

5. A television view finder comprising a track having a carriage, a photographic camera and a television camera on said carriage for viewing the same scene, means supporting said cameras in elevated position, a remote control station having separate means for (a) stopping and starting said camera (b) controlling the direction of movement of said carriage (c), controlling the speed of said carriage; a view finder for presenting at said station the scene being photographed and televised, a television receiver and screen therefor, said receiver having conductors extending along said track, and circuits having sliding contacts connecting said television camera to said receiver during movement of said carriage along said track.

MAX O. MILLER.

(References on following page)

REFERENCES CITED

The following references are of record in the file of this patent:

UNITED STATES PATENTS

| Number | Name | Date |
|---|---|---|
| 2,019,059 | Sherman | Oct. 29, 1935 |
| 2,162,908 | Bedford | June 20, 1939 |
| 2,166,132 | Ammen | July 18, 1939 |
| 2,269,862 | Rose | Jan. 13, 1942 |
| 2,417,446 | Reynolds | Mar. 18, 1947 |
| 2,420,197 | Rosenthal | May 6, 1947 |
| 2,433,971 | Adams | June 6, 1948 |

FOREIGN PATENTS

| Number | Country | Date |
|---|---|---|
| 504,750 | Great Britain | May 1, 1939 |

OTHER REFERENCES

RCA Review, Sept. 1946, vol. VII, No. 3, pages 338 to 357.

Proc. IRE, June 1946, pages 375 to 401.